US010678683B2

(12) United States Patent
Ranjan et al.

(10) Patent No.: US 10,678,683 B2
(45) Date of Patent: Jun. 9, 2020

(54) SYSTEM AND METHOD FOR AUTOMATED SERVICE LAYER TESTING AND REGRESSION

(71) Applicant: JPMorgan Chase Bank, N.A., New York, NY (US)

(72) Inventors: Vipul Ranjan, Bangalore (IN); Srinivasa R. Podugu, Piscataway, NJ (US); Biren A. Desai, Bangalore (IN); Sunanda Dhingra, Bangalore (IN); Ravi K. Gelli, Bangalore (IN); Ashwini Jambagi, Bangalore (IN); Sheril Joseph, Bangalore (IN); Agim Perolli, Carmel, NY (US); Ulku Rowe, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 128 days.

(21) Appl. No.: 15/914,517

(22) Filed: Mar. 7, 2018

(65) Prior Publication Data
US 2019/0278700 A1    Sep. 12, 2019

(51) Int. Cl.
*G06F 11/36* (2006.01)

(52) U.S. Cl.
CPC ...... *G06F 11/3688* (2013.01); *G06F 11/3676* (2013.01); *G06F 11/3684* (2013.01); *G06F 11/3692* (2013.01)

(58) Field of Classification Search
CPC ............. G06F 11/3684; G06F 11/3688; G06F 11/0778; G06F 11/3692; G06F 11/3672; G06F 11/2221
See application file for complete search history.

(56) References Cited

U.S. PATENT DOCUMENTS

| 8,191,048 | B2 * | 5/2012 | Parthasarathy ..... G06F 11/3664 717/124 |
| 8,381,197 | B2 * | 2/2013 | Meenakshisundaram .................. G06F 11/3664 717/135 |
| 9,734,044 | B2 * | 8/2017 | Harden ............... G06F 11/3684 |
| 9,767,008 | B2 * | 9/2017 | Harden ............... G06F 11/3684 |
| 10,078,579 | B1 * | 9/2018 | Joshi .................. G06F 11/3688 |
| 2010/0131928 | A1 * | 5/2010 | Parthasarathy ..... G06F 11/3664 717/126 |

(Continued)

*Primary Examiner* — Nadeem Iqbal
(74) *Attorney, Agent, or Firm* — Hunton Andrews Kurth LLP (57) ABSTRACT

The invention relates to a computer-implemented system and method for service level testing and regression. The method may comprise the steps of automatically intercepting service requests from users; storing the service requests in a test database; generating a set of service request test cases from the service requests, wherein the test cases represent substantially all forms of service requests but eliminate redundant service requests, e.g., those that are different only due to input data; executing service testing using all of the test cases; and generating a report of results from the service testing. The step of executing service testing may comprise testing of an earlier code version to generate a baseline response and testing a current code version to generate a target response. The step of generating a report may comprise generating a regression test report that includes the baseline response and the target response for the test cases.

8 Claims, 5 Drawing Sheets

(56) References Cited

U.S. PATENT DOCUMENTS

2015/0254171 A1\* 9/2015 Harden ............... G06F 11/3684
717/124

\* cited by examiner

Run services    Services were last run on 19-May-2016 02:01:06 AM

| | FUNCTION NAME | SERVICE URL | RESPONSE TIME | STATUS | NAME |
|---|---|---|---|---|---|
| ☐ | | http://psin0p011.svr.us.jpmchase.net:9095/xpeservices/xperest/runNumber | | FAILED | xpeservices |
| ☐ | | http://psin0p011.svr.us.jpmchase.net:9095/xpeservices/xperest/facility/history/rec... | | FAILED | xpeservices |
| ☐ | | http://psin0p011.svr.us.jpmchase.net:9095/xpeservices/xperest/facility/history/mo... | | FAILED | xpeservices |
| ☐ | | http://psin0p011.svr.us.jpmchase.net:9095/xpeservices/xperest/facility/band | | FAILED | xpeservices |
| ☐ | | http://psin0p011.svr.us.jpmchase.net:9095/xpeservices/xperest/facility/calc | | FAILED | xpeservices |
| ☐ | | http://psin0p011.svr.us.jpmchase.net:9095/xpeservices/xperest/ns | | FAILED | xpeservices |
| ☐ | SEARCH_SYSTEMCONTEXT_... | /icrdtiles/services/getsystemcontext | 197 | DONE | ICRD |
| ☐ | SEARCH_SELMCONTEXT_QU... | /icrdsearch/api/admin/getselmcontext | 62 | DONE | ICRD |
| ☐ | GET_TASKS_OVERDRAFT_CO... | /icrdtiles/services/tasks/overdraftComments | 209 | DONE | ICRD |
| ☐ | GET_CLIENT_COVERAGE | /icrdtiles/services/clientCoverage | 421 | DONE | ICRD |
| ☐ | SEARCH_FACILITY_TEXT | /icrdsearch/api/search/facility/text | 280 | DONE | ICRD |
| ☐ | SEARCH_FACILIT_QUERY | /icrdsearch/api/search/facility/query | 243 | DONE | ICRD |
| ☐ | GET_OVERDRAFT_INDICATOR... | /icrdtiles/services/tasks/overdraftIndicatorLegend | 143 | DONE | ICRD |
| ☐ | GET_OVERLIMIT_DETAILS | /icrdtiles/services/tasks/overlimitDetails | 259 | DONE | ICRD |
| ☐ | GET_PROPOSAL_APPROVER... | /icrdtiles/services/tasks/proposalApproverDetails | 224 | DONE | ICRD |
| ☐ | GET_PROPOSAL_ASSIGNMEN... | /icrdtiles/services/tasks/proposalAssignmentDetails | 331 | DONE | ICRD |
| ☐ | GET_ERROR_TASKS | /icrdtiles/services/tasks/errorTasks | 166 | DONE | ICRD |
| ☐ | GET_CLEAR_ERROR_TASKS | /icrdtiles/services/tasks/clearErrorTasks | 243 | DONE | ICRD |
| ☐ | BATCH_SEARCH_SYSTEMCO... | /icrdsearch/batchspi/admin/getsystemcontext | 68 | DONE | ICRD |
| ☐ | GET_ALERTS_INVENTORY | /icrdportal/services/alerts/getInventory | 187 | DONE | ICRD |
| ☐ | GET_CLIENT_ADDRESS | /icrdtiles/services/clientSummary/clientAddress | 289 | DONE | ICRD |
| ☐ | GET_CLIENT_RATINGS | /icrdtiles/services/clientAdditionalRatings | 967 | DONE | ICRD |
| ☐ | ELASTIC_CLUSTER_HEALTH | /icrdsearch/searchadmin/clusterHealth | 40 | DONE | ICRD |
| ☐ | ELASTIC_INDEX_TYPES | /icrdsearch/searchadmin/indices/types | 47 | DONE | ICRD |
| ☐ | ELASTIC_INDEX_HUD | /icrdsearch/searchadmin/indices/hud | 257 | DONE | ICRD |
| ☐ | ELASTIC_NODES_LIST | /icrdsearch/searchadmin/nodes | 54 | DONE | ICRD |
| ☐ | ELASTIC_INDEX_META | /icrdsearch/searchadmin/index/metadata | 309 | DONE | ICRD |
| ☐ | COLLATERAL_SUMMARY | /icrdtiles/services/collateral/summary | 22735 | DONE | ICRD |
| ☐ | GET_LEGAL_DOC_SECTION_... | /icrdtiles/services/legaldoc/detailSectionView | 19184 | DONE | ICRD |

Figure 4

| KEY NAME | BASE VALUE | TARGET VALUE | STATUS |
|---|---|---|---|
| data[3].clientOld | 3982 | 3982 | MATCHED |
| data[3].clientUon | 000049858000 | 000049858000 | MATCHED |
| data[3].cobDate | null | 29-Jan-2016 00:00:00 AM | DID_NOT_MATCH |
| data[3].cobDateFacility | 2016018900005741 | 2016018900005741 | MATCHED |
| data[3].cobDate_original | FIELD_NOT_PRESENT | 1454043600000 | NOT_PRESENT_IN_BASELINE |
| data[3].currentExposure | null | null | MATCHED |
| data[3].equityStyleTheoreticalMTM | null | null | MATCHED |
| data[3].facPrimBookingPrincLeDesc | Z.B. HOPNXR MFUIPCTCFM BEU | Z.B. HOPNXR MFUIPCTCFM BEU | MATCHED |
| data[3].facPrimBookingPrincLeid | 3308 | 3308 | MATCHED |
| data[3].facilityId | 890005741 | 890005741 | MATCHED |
| data[3].futureStyleTheocreticalMTM | null | null | MATCHED |
| data[3].imAmount | null | 596474.926294672 | DID_NOT_MATCH |
| data[3].imAmountGaussOffline | null | null | MATCHED |
| data[3].imAmountGaussOnline | null | null | MATCHED |
| data[3].institutionType | Bank | Bank | MATCHED |
| data[3].isGroupLevel | true | false | DID_NOT_MATCH |
| data[3].lgd | 35.0 | 35.0 | MATCHED |
| data[3].maxAverage | 3642827.34 | 3642827.34 | MATCHED |
| data[3].maxCollateralExposure | null | null | MATCHED |
| data[3].maxCurrentExp | null | null | MATCHED |
| data[3].maxDRE | 3642827.34 | 3642827.34 | MATCHED |
| data[3].maxDreGaussOffline | null | null | MATCHED |
| data[3].maxDreGaussOnline | null | null | MATCHED |
| data[3].maxNumDeals | 24 | null | MATCHED |
| data[3].maxPeak | 3642827.34 | 3642827.34 | DID_NOT_MATCH |
| data[3].maxPeakGaussOffline | null | null | MATCHED |
| data[3].maxPeakGaussOnline | null | null | MATCHED |
| data[3].maxPeakTenorBand | null | null | MATCHED |
| data[3].maxSourceLegalMTM | null | null | MATCHED |

Figure 5

SYSTEM AND METHOD FOR AUTOMATED SERVICE LAYER TESTING AND REGRESSION

FIELD OF THE INVENTION

The present invention relates generally to testing of services, and more particularly to a system and method for automated service layer testing and regression.

BACKGROUND

Many modern applications work on an n-tier architecture in which a web-based user interface (UI) makes a call to a webservice which in turn retrieves data from a data storage system. In the last few years, the service layer has been standardized across the industry to use RESTful webservices that work based on a JSON input and output structure. Most new service layer implementations currently use this standard.

In software engineering, unit testing is a process by which individual units of source code are tested to determine if they are acceptable for use. A unit refers to the smallest testable part of a software application. In addition to unit testing, it is desirable to conduct service layer testing, since service layer testing reveals whether independently working unit tests give the expected result when combined together. Regression testing is also beneficial. Regression testing refers to the testing of software that has been previously tested to determine whether it still performs correctly after being modified or interfaced with other code. During regression testing, new bugs or regressions may be discovered.

Though service layer testing and regression are very desirable, there is no easy way to conduct them, since each service takes in a unique input JSON file and responds with a JSON output file that is unique to the particular service request. As such, to achieve 100% service layer testing, developers need to spend a significant amount of time forming input service requests manually and then need to manage these requests over the active lifecycle of the application. This approach is cumbersome and leads to service test cases going stale relatively frequently for the following reasons. First, developers need to manually code the service requests. The manual coding process introduces a significant risk of human error and takes significant time. As a workaround, development teams often decide to conduct service layer testing of only a subset of all services, thereby compromising the thoroughness of the testing. Second, if there are any changes to an existing service input structure due to a business requirement, then the developer must go back and update the input request that is already stored. Third, if the underlying data changes, then the same services that were responding well to the given input will no longer behave well. Thus, the developer must go back and update the data parameters of the service request. Finally, any additional service that is created or requested in the future will need to go through the foregoing steps 1, 2 and 3. Hence, known service layer testing processes require continual attention and maintenance. These and other drawbacks exist with known systems and processes.

SUMMARY

According to one embodiment, the invention relates to a computer-implemented system and method for providing service layer testing and regression. The method may be executed on a specially programmed computer system comprising one or more computer processors, electronic storage devices, and networks. The method may comprise the steps of automatically intercepting actual service requests from users; storing the actual service requests in a test database; generating a set of service request test cases from the actual service requests, wherein the test cases represent substantially all forms of actual service requests but eliminate redundant service requests, e.g., those that are different only due to input data; executing service testing using the test cases; and generating a report of results from the service testing. The step of executing service testing may comprise testing of an earlier code version to generate a baseline response and testing a current code version to generate a target response. The step of generating a report may comprise generating a regression test report that includes the baseline response and the target response for the test cases.

The invention also relates to computer-implemented system for automated service layer testing and regression, and to a computer readable medium containing program instructions for executing a method for automated service layer testing and regression.

Exemplary embodiments of the invention can provide a number of advantages to groups or individuals responsible for service level testing and regression. For example, developers, quality engineers, or other IT staff no longer need to manually code the test requests, because the system captures all actual tests automatically on an ongoing basis. Furthermore, because all actual service requests are captured and stored, all of the services, rather than merely a subset, will have corresponding service request test cases. In addition, because the system captures actual service requests on an ongoing basis, changes to the structure of input service requests and new service requests are automatically captured and incorporated into the testing process. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 is a sample of an output report showing the results of automated service level testing according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
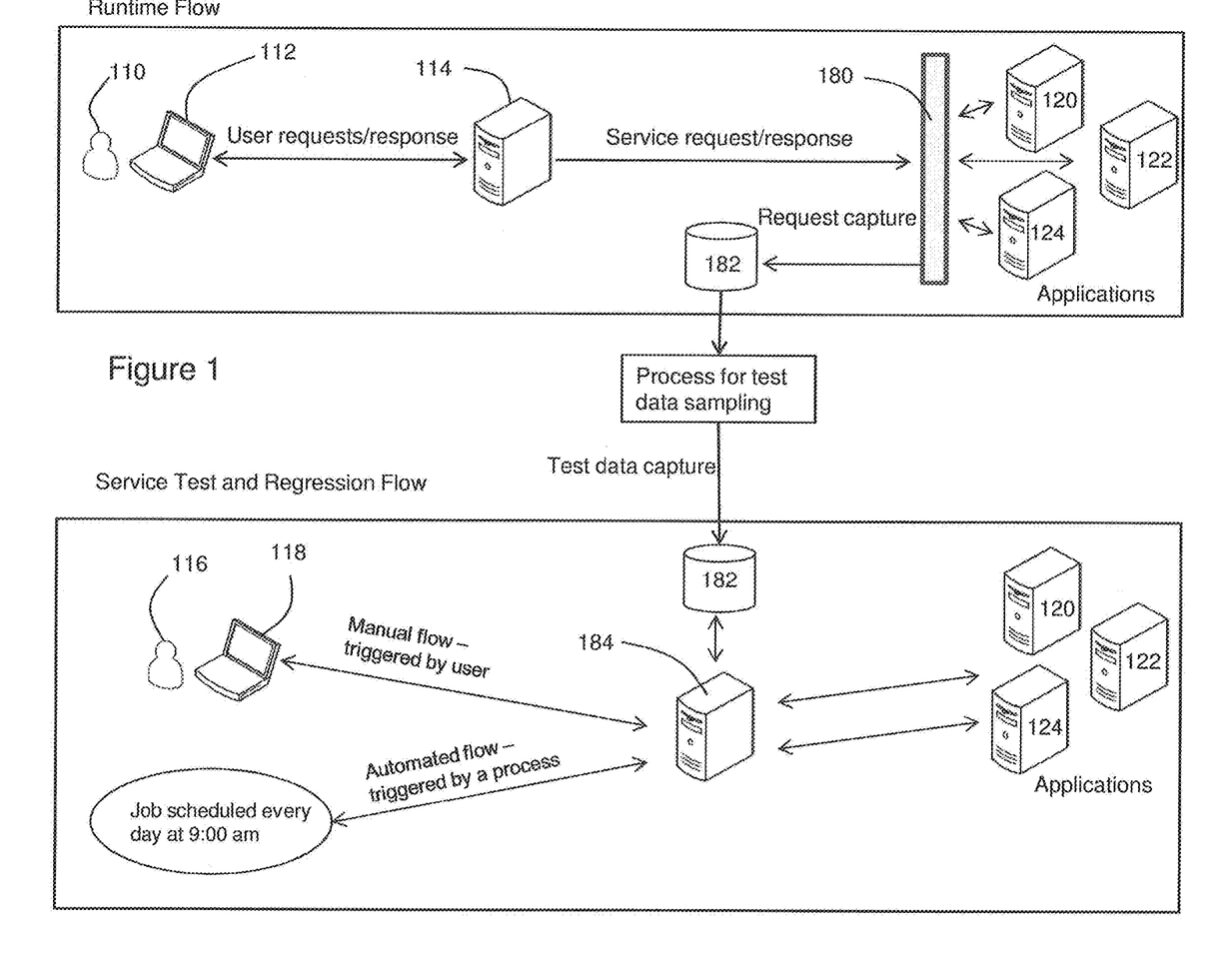
FIG. 1 is a diagram showing an example of a service layer testing architecture and process according to an exemplary embodiment of the invention.

Referring now to the drawings, FIG. 1 is a diagram of a service testing and regression (STAR) system according to an exemplary embodiment of the invention. As shown in FIG. 1, the system may include one or more computing devices, such as servers and personal computers. The system may also include one or more networks that connect the various computing devices shown in FIG. 1. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The system may be operated by a business, an IT services company, a consulting company, or other type of organization that seeks to conduct service layer testing and regression of software applications.

The process starts with a user 110 conducting various tasks or operations using a web-based system on his or her personal computing device 112. One example is an analyst at a company who uses the system to retrieve customer data, store customer data, analyze credit risk, and generate contracts, correspondence, reports, and other documents. Another example is a customer service representative at a retailer who uses a product ordering system to retrieve data, store data, perform calculations, order products, generate reports, and/or perform other operations relating to various products, services, and customers of the retailer. According to a preferred embodiment, the user interface of the system is a browser-based website that includes its own logic and code, but that also makes calls to various applications residing on servers 120, 122, 124 to perform other services. According to an exemplary embodiment, the services are RESTful webservices based on JSON input, the user interface is developed in HTML, Android, iOS, Java, or .NET, and the services are implemented in Java, Python, or .NET, for example.

The user's request is initially transmitted to an authentication server 114 that authenticates the user 110 by requesting and verifying the user's credentials (e.g., username, password and/or other credentials for authentication). Once the user 110 has been authenticated, the request may be passed to the appropriate application server through the authentication server 114. FIG. 1 shows a number of application servers 120, 122, 124 that run various applications called by the user 110, such as applications for storing and retrieving customer data, calculation of discounts and prices, ordering of products and services, and generation of reports. Although the example in FIG. 1 illustrates three application servers 120, 122, 124 and one user 110, in practice the system may be used by many users and may include any suitable number of application servers. Exemplary embodiments of the invention may also be used by many different types of businesses and organizations, as will be appreciated by those skilled in the art.

According to an exemplary embodiment of the invention, input service requests from the users 110 are automatically captured and stored. The server 120, 122, 124 that services the request captures actual user requests and stores them in a database. The capture and storage functions are depicted graphically in FIG. 1 by an interceptor 180 and a database 182, respectively. According to an exemplary embodiment of the invention, the interceptor 180 may comprise software code that resides with the application in each application server 120, 122, 124. The interceptor code intercepts each service request as it is received, maps each requests against the service to which it belongs, and transmits each request to the database 182 for storage. In this way, all service requests are captured, which provides the advantage of allowing for a complete and comprehensive testing plan of all requests, rather than testing of only a subset of service requests.

Figure 2:
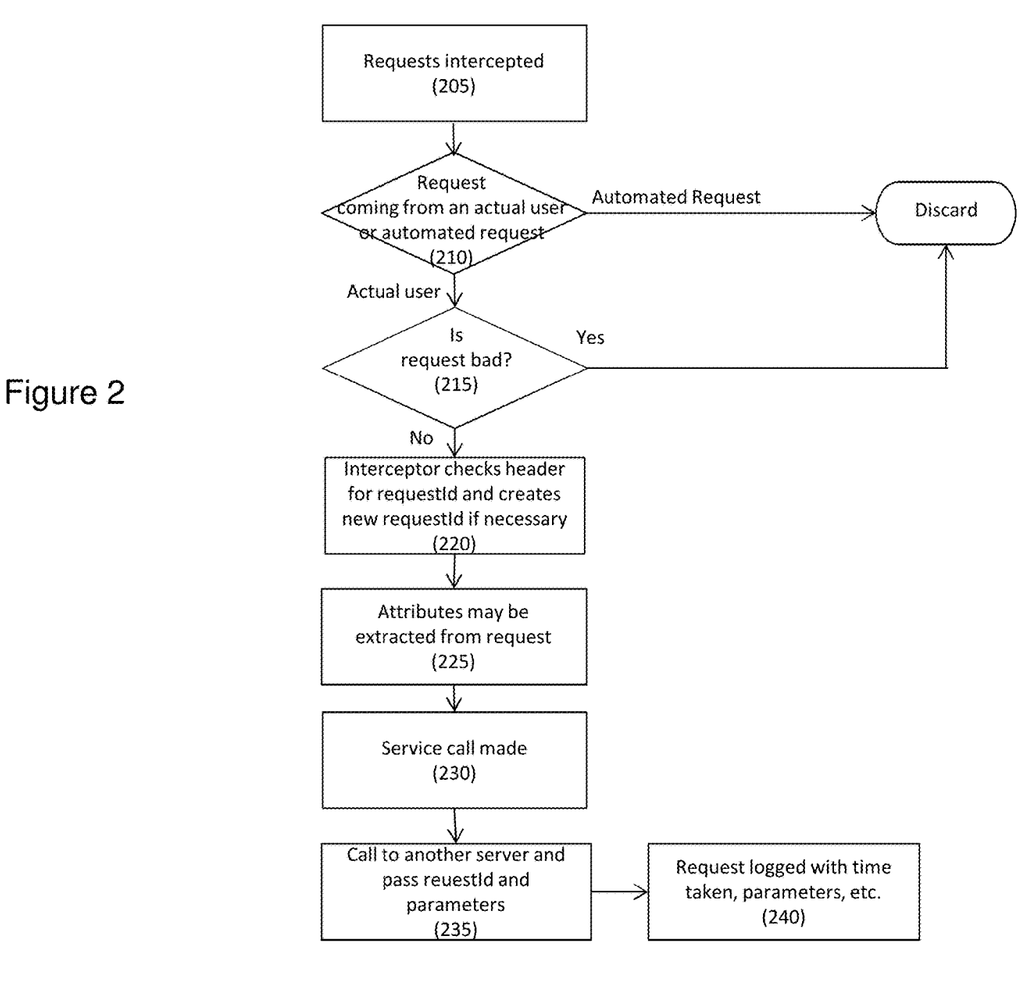
FIG. 2 is a flowchart depicting a request capture according to one embodiment of the invention.

FIG. 2 illustrates an automated process for capturing service requests according to an exemplary embodiment of the invention. In step 205, service requests may be intercepted by the interceptor 180. In step 210, the interceptor 180 may be programmed to identify certain service requests that are coming from automated or batch processes. These software-initiated (as opposed to human-initiated) service requests may be discarded. If the interceptor 180 determines that the service request is received from an actual user, then the service request is retained for further processing. In step 215, if the received request does not conform to the service API standard inputs and protocols then the request may be discarded. Such requests may be termed as "bad requests."

If the received request is a valid request (that is, it is neither a bad request nor a non-human request), in step 220 the interceptor may check the header of the service request for a parameter called "requestID." The requestID may comprise a unique identification code for each service request received by the system. This may be useful or necessary since the information needed to fulfil a valid request may not lie entirely on one server and there may be a need to invoke other services to get the complete information. This concept of requestID can be used to identify all the services that were invoked to provide the information needed for the actual valid human request. If there is no "requestID," the interceptor 180 may create a new requestID. This requestID is passed along with the header in all subsequent calls according to an exemplary embodiment of the invention.

Figure 3:
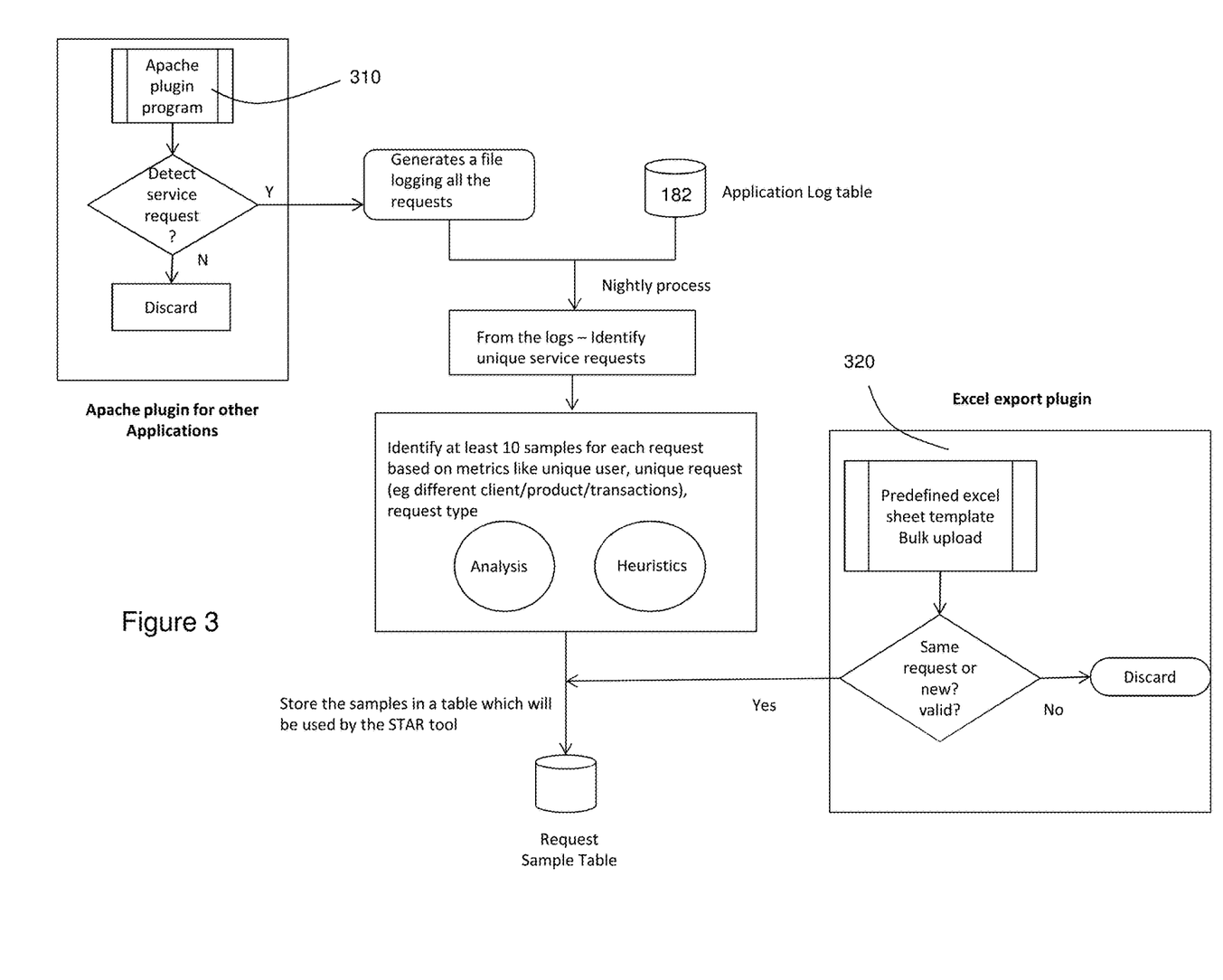
FIG. 3 is a flowchart depicting a method of capturing test data according to an exemplary embodiment of the invention.

In step 225, several attributes such as requested_user_Id (identifier for the actual end user who was seeking to get the information—for example standard ID of employees such as A123456), service url (the type of information that end user was seeking—for example client information or trade information), params (the attributes of the information—for example client ID or trade ID along with the date for which information was being sought) may be extracted from the request. Additional or fewer attributes may be extracted as is necessary and/or desired. This step can be performed asynchronously. Additional details and several variations of this step are illustrated in FIG. 3.

Once the process for capturing the incoming valid request has been triggered, the system proceeds to retrieve all the information needed to serve the user requests. In step 230 the right server call (based on the service_url) is invoked. This server call may in turn invoke other servers (step 235) to retrieve additional data as requested by the user. Once all the information has been collected, it is converted to a JSON format agreed upon as part of the API contract.

In step 240, the request may be logged with the time taken, the parameters, URL, etc. In one embodiment, the request may be logged to an application log table stored in the database 182. Once this information has been collected and recorded, the response is sent back to the user machine.

Referring again to FIG. 1, at any desired time or periodically (e.g., nightly), the STAR system can execute a process to generate a complete set of service request test cases. FIG. 1 illustrates that the authorized group or individual 116 can initiate this process, or the process can be automatically initiated, e.g., every day at a defined time such as 9:00 am, as one example. The test cases are generated automatically by an admin server 184, which is associated with and linked to the database 182. The admin server 184 may include a software module that executes a process to convert the entire list of actual service requests stored in the database 182 into a complete list of test cases, which are then also stored in the database 182. According to one embodiment of the invention, the service testing and regression (STAR) system comprises the interceptor 180, the database 182, and the admin server 184.

The process to convert the entire list of actual service requests into a complete list of test cases involves executing a program to identify all possible examples of the service requests, other than redundant service requests, such as those that vary based only on different input data. For example, the STAR system may have stored 2,000 actual requests to retrieve the mobile phone number for 2000 different customers; however the program logic in the admin server 184 would create only one test case for retrieval of a customer's mobile phone number according to one embodiment of the invention. The software in the admin server 184 performs a similar function to identify all possible non-redundant forms of service requests. It then stores those examples as the service request test cases in the database 182.

FIG. 3 illustrates a method of capturing test data according to one embodiment of the invention. As shown in FIG. 3, a plugin 310, such as the Apache plugin program, may detect requests from an application. If the request is a service request, the service requests may be logged in a file.

Periodically (e.g., nightly), unique service requests may be identified from the logs, and a predetermined number of samples for each request may be identified. For example, the samples may be based on various service input parameters, such as a user, the department she belongs to, and the type of the client she is seeking information for. The requests may also be a unique request, based on, for example, different clients, products, transactions, etc. This is typically necessary since the services may respond differently for different use cases. Hence, the requests recorded for a particular service may be different from each other and may signify different categories of use cases. All possible scenarios may be covered by analyzing the incoming service request and the response that has been generated. Further, a statistical approach to identify the new use cases may be employed to ensure that the system automatically captures the change in underlying services.

Next, for systems that want to use the STAR application, but may have not been able to incorporate the Apache or Java interceptor plugins, an option can be provided to upload and store the request samples using a Microsoft Excel import plugin, wherein a template is provided and all the different requests, services, etc. can be filled in by a user. The box 320 in FIG. 3 illustrates how the Excel upload works. This embodiment provides an alternative to capturing requests through automation using the Apache or Java interceptor plugins. All these requests may be stored in the same request sample table, which may be part of the database 182.

Referring again to FIG. 1, once the service request test cases have been generated and stored in the database 182, the admin server 184 can be used to conduct service layer testing and regression. The admin server 184 includes software having a user interface that enables various authorized groups or individuals 116 to request or conduct testing of the services using the test cases stored in the database 182. The groups or individuals 116 may be authorized parties within the company organization, such as software developers, quality testing engineers, or other IT personnel. If the authorized group or individual requests the testing (rather than conducting the testing itself), the administrator can carry out the requested testing.

FIG. 4 illustrates an example of output from the STAR system resulting from testing of the services. As shown in FIG. 4, the output can be in the form of a table where each row is a service request test case that has been run by the STAR system and the columns provide data related to each test case. In this example, the name of each test case is listed in the first column ("Function Name"), the second column identifies the uniform resource identifier (URI) for the service, the third column provides the response time for completing the test, the fourth column provides a status of the test, and the fifth column provides the name of the group or team within the company or organization that is responsible for maintaining the service. The table also has a caption in the header indicating when the services were last run. As can be seen in the example of FIG. 4, the first six tests failed, as indicated in the status column. In addition, the response time of the last two services is notably longer than the response times of all the other services, which suggests that there may be a problem with those services. FIG. 4 can thus provide a comprehensive summary of whether the selected test cases passed and if so whether the response time for each service was appropriate. The user can also conduct the testing knowing that he or she has a complete list of test cases that has been automatically generated, rather than a subset that has been created manually by IT staff that may contain errors or omissions.

The user interface of the acceptance testing software also allows authorized groups or individuals 116 to request or conduct regression testing. Regression testing refers to the testing of software that has been previously tested to determine whether it still performs correctly after being modified or interfaced with other code. During regression testing, new bugs or regressions may be identified. The user interface allows the user to specify the baseline code version (prior to the modification at issue) and the updated code version after modifications have been implemented. The modifications may include, for example, new code deployment, an upstream service change, a version change of a development kit (e.g., Java SE Development Kit), a Spring library change (https://Spring.io), or a database table change. The regression analysis involves running a test on the baseline code to get a baseline response, running the same test after modifications have been made to get a target response, and comparing the responses before and after the modification.

Figure 5:
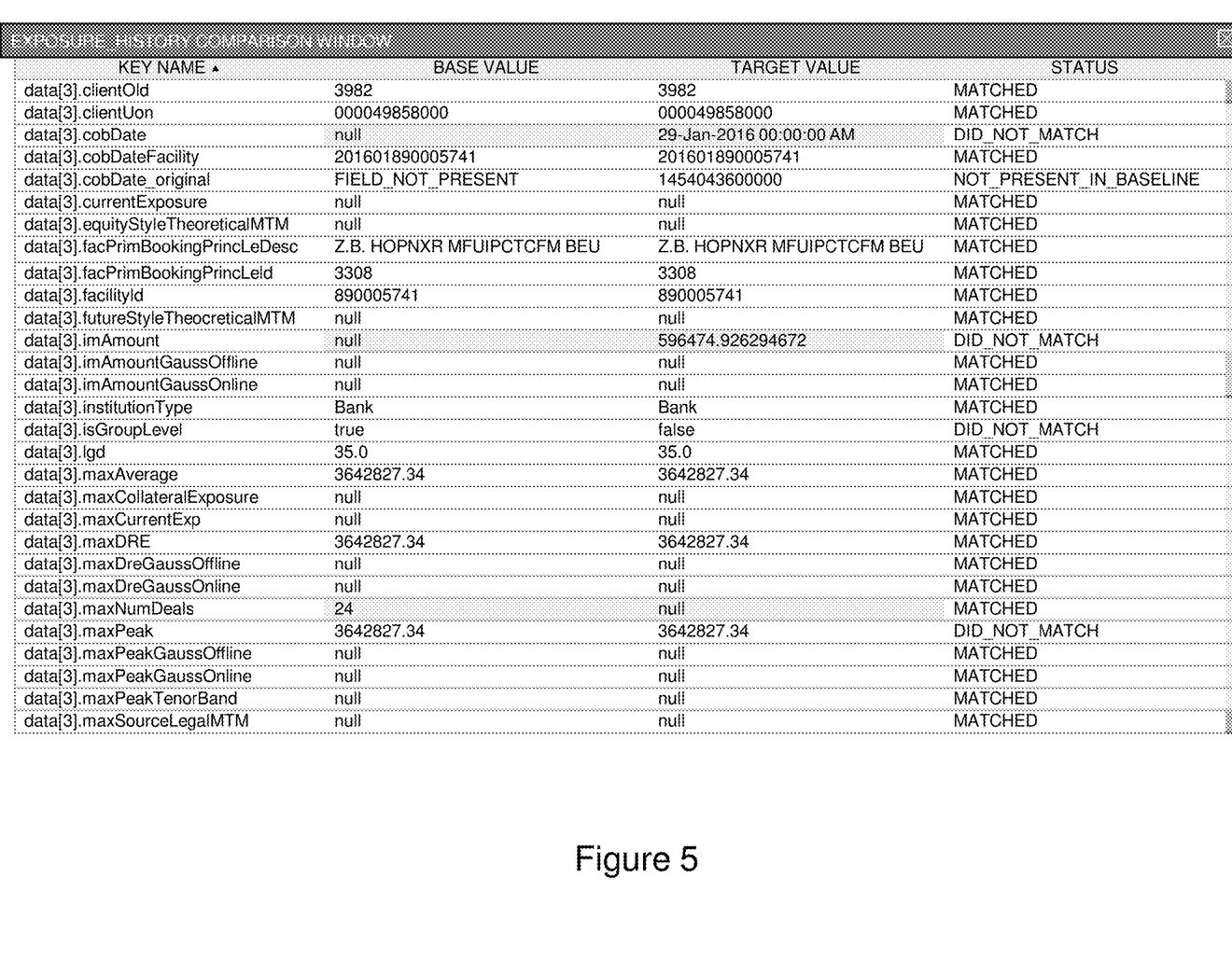
FIG. 5 is a sample of an output regression test report showing the results of regression testing according to an exemplary embodiment of the invention.

FIG. 5 illustrates an example of a data comparison between the baseline response and the target response that facilitates regression analysis. As shown in FIG. 5, the results can be provided in the form of a table. Each row in the table represents a regression test that has been performed. The columns provide relevant information for each test. Column 1 lists the key name of the test. Column 2 lists the baseline value, i.e., the value resulting from the baseline test before modifications were made. Column 3 lists the target value, i.e., the value resulting from the test after modifications were made. Column 4 lists the status of the regression test, such as whether the target matched the baseline, whether the target did not match the baseline, or whether the value was not present in the baseline.

The tabular format of FIG. 5 provides the user with a summary of the results of the regression test. In the example in FIG. 5, the user can see that the "cobDate" test in the third row did not produce matching results because the baseline value was null and the target value returned a specific value (29-Jan-2016 00:00:00 AM). A similar situation occurred with the "imAmount" test. As for the "maxNumDeals" test, the baseline test returned a value of 24, whereas the target value was null, which could indicate a problem. This could potentially list out issues in the service or data quality issues.

Exemplary embodiments of the invention can thus provide a number of advantages to groups or individuals responsible for service level testing and regression. For example, developers, quality engineers, or other IT staff no longer need to manually code the test requests, because the STAR system captures all actual tests automatically on an ongoing basis. This process saves a large amount of time and also eliminates the risk of human errors that arise from manually coding the test cases. In addition, because all actual service requests are captured and stored, all of the services, rather than merely a subset, will have corresponding service request test cases. Hence, the process provides comprehensive testing of all services and eliminates the risk that important tests have been omitted because they were overlooked. Also, if the structure of an input service request changes, such as due to a business requirement, the new structure will be captured by the interceptor 180 on subsequent runs and that new structure will be stored in the database of actual test cases 182. This advantage is obtained because the interceptor 180 captures and stores the actual service requests on a continuous, ongoing basis. A new service request input structure will also be identified by the software in the admin server 184, which will generate corresponding new test cases for it. This eliminates the need for a developer, quality engineer, or other IT staff to manually create a new test case when the input structure is modified. In addition, when new services are invoked, the STAR system records the corresponding actual service requests and automatically creates test cases for them.

Those skilled in the art will appreciate that the diagram shown in FIG. 1 is merely one example of a STAR system configuration and is not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and personal computers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications network in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications network in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

Although examples of servers 114, 120, 122, 124, 184 and personal computing devices 112, 118 are shown in FIG. 1, exemplary embodiments of the invention may utilize other types of communication devices whereby a user may interact with a network that transmits and delivers data and information used by the various systems and methods described herein. The personal computing devices 112, 118 may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 112, 118 may include various connections such as a cell phone connection, WiFi connection, Bluetooth connection, satellite network connection, and/or near field communication (NFC) connection, for example.

As described above, FIG. 1 includes a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices 112, 118. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for service level testing, the method comprising:
   automatically intercepting, via an interceptor comprising software residing on an application server, actual service requests from users;
   reading a header of each actual service request to determine if each actual service request contains a unique identification code for the service request;

creating a unique identification code for each actual service request that does not contain a unique identification code;
passing the unique identification code with the header;
storing the actual service requests in a test database;
automatically generating a set of service request test cases from the actual service requests, wherein the test cases represent substantially all forms of actual service requests but eliminate redundant service requests and wherein automatically generating a set of service request test cases further comprises identifying unique service requests from a log of all service requests, identifying a predetermined number of samples for each service request based on at least one of: a unique user, a unique request, and a request type, and storing the samples in a table for testing;
executing service testing using the test cases; and
generating a report of results from the service testing.

2. The method of claim 1, wherein:
the step of executing service testing comprises testing of an earlier code version to generate a baseline response and testing a current code version to generate a target response; and
the step of generating a report comprises generating a regression test report that includes the baseline response and the target response for the test cases.

3. The method of claim 1, wherein the interceptor comprises an Apache plugin program or a Java plugin program.

4. The method of claim 1, further comprising:
determining with the interceptor whether the request originated from an actual user or from an automated request; and
discarding the request if the request did not originate from an actual user.

5. The method of claim 1, further comprising:
determining with the interceptor whether the service request conforms to inputs and protocols of a service API; and
discarding the service request if the service request does not conform to the inputs and protocols of the service API.

6. The method of claim 1, wherein the step of automatically generating a set of service request test cases is initiated automatically on a periodic basis.

7. The method of claim 1, wherein the step of automatically intercepting actual service requests from users is initiated on demand by a user.

8. The method of claim 1, further comprising:
providing a spreadsheet template to enable a user to upload a set of service request test cases.

* * * * *